(12) United States Patent
Omari (10) Patent No.: US 11,738,822 B2
(45) Date of Patent: Aug. 29, 2023

(54) CHASSIS FOR SMALL ELECTRICAL VEHICLES

(71) Applicant: Muhr und Bender KG, Attendorn (DE)

(72) Inventor: Ahmad Omari, Aachen (DE)

(73) Assignee: Muhr und Bender KG, Attendorn (DE)

( * ) Notice: Subject to any disclaimer, the term of this patent is extended or adjusted under 35 U.S.C. 154(b) by 0 days.

(21) Appl. No.: 17/779,618

(22) PCT Filed: Nov. 26, 2020

(86) PCT No.: PCT/DE2020/000295
§ 371 (c)(1),
(2) Date: May 25, 2022

(87) PCT Pub. No.: WO2021/104556
PCT Pub. Date: Jun. 3, 2021

(65) Prior Publication Data
US 2023/0035453 A1 Feb. 2, 2023

(30) Foreign Application Priority Data
Nov. 26, 2019 (DE) ............ 10 2019 008 193.5

(51) Int. Cl.
B62K 5/08 (2006.01)
B62D 21/11 (2006.01)
B62K 3/00 (2006.01)

(52) U.S. Cl.
CPC ............ *B62K 5/08* (2013.01); *B62D 21/11* (2013.01); *B62K 3/002* (2013.01)

(58) Field of Classification Search
CPC ....................................... B62K 5/08
See application file for complete search history.

(56) References Cited

U.S. PATENT DOCUMENTS 4,288,096 A  9/1981 Enokimoto et al.
4,407,383 A * 10/1983 Enokimoto ........ B62D 21/183
                                                180/908

(Continued)

FOREIGN PATENT DOCUMENTS

DE    20100372 U1    3/2001
DE    20102680 U1 *  5/2001  ............ B62K 3/002

(Continued)

OTHER PUBLICATIONS

International Search Report and Written Opinion for PCT/DE2020-000295 dated Mar. 12, 2021 (10 pages; with English machine translation).

*Primary Examiner* — Paul N Dickson
*Assistant Examiner* — Shams Dhanani
(74) *Attorney, Agent, or Firm* — Bejin Bieneman PLC (57) ABSTRACT

A running gear for small electrical vehicles provides the possibility of inclining and of steering the vehicle and of damping bumps in the carriageway, the chassis comprising a frame connection to the vehicle frame, a rigid or damped rocker beam assembly, a central bolt, a flexible transverse link plate, two uprights for keeping hold of the two front wheels, and two steering rods which each connect one of the two uprights to the steering device. The area of use comprises multi-wheeled small vehicles.

14 Claims, 9 Drawing Sheets

(56) References Cited

U.S. PATENT DOCUMENTS

| | | | | |
|---|---|---|---|---|
| 2015/0239522 A1* | 8/2015 | Iizuka | ................... | B62K 5/08 |
| | | | | 280/267 |
| 2016/0137251 A1* | 5/2016 | Mercier | ............... | B60G 13/005 |
| | | | | 180/210 |
| 2016/0229246 A1* | 8/2016 | Mori | ........................ | B62K 5/01 |
| 2016/0257368 A1* | 9/2016 | Aponte-Rivera | ........ | B62K 5/01 |
| 2023/0031917 A1* | 2/2023 | Dray | ..................... | B62K 3/002 |

FOREIGN PATENT DOCUMENTS

| | | | | |
|---|---|---|---|---|
| DE | 20102680 U1 | 5/2001 | | |
| DE | 102006057167 A1 | 6/2008 | | |
| EP | 2712796 A2 | 4/2014 | | |
| GB | 2225990 A | 6/1990 | | |
| WO | WO-2018060869 A1 * | 4/2018 | ........... | B60G 13/003 |

* cited by examiner

CHASSIS FOR SMALL ELECTRICAL VEHICLES

CROSS-REFERENCE TO RELATED APPLICATIONS

This application is a national stage of, and claims priority to, Patent Cooperation Treaty Application No. PCT/DE2020/000295, filed on Nov. 26, 2020, which application claims priority to German Application No. DE 10 2019 008 193.5, filed on Nov. 26, 2019, which applications are hereby incorporated herein by reference in their entireties.

BACKGROUND

Small electric vehicles such as pedal scooters or skateboards are increasingly seen as an important part of the mobility transition, especially as a means of urban transportation. In most cases, these vehicles are equipped with simple running gears, making road irregularities such as cobblestones or curbs an obstacle. A conventional running gear, as known from motor vehicles (cars), would be a solution to increase driving comfort, but is usually too elaborate for use in the small electric vehicle segment and does not justify the additional costs.

The utility models DE 201 00 372 U1 and DE 201 02 680 U1 disclose three-wheeled pedal scooters which have two wheels in the front area and one wheel in the rear area. Among other things, the design is intended to increase driving safety compared to conventional two-wheeled pedal scooters. The two front wheels are mounted on running gear that enables a tilting movement of the scooter to be converted into a steering movement of the front wheels. The running gear includes two springs. Their task is not to dampen unevenness in the road, but merely to move the scooter into an untilted position in the unloaded state. This ensures that the scooter can only be tilted if the rider intends to do so by shifting his or her body weight.

DE 10 2006 057 167 A1 discloses a running gear for a roller board, for example a skateboard. It comprises, among other things, a cross member for receiving the front wheels. The cross member is mounted by means of an axle on the roller board, called the plate body, whereby the cross member can be tilted relative to the plate body. In addition, two steering rods are used, called connecting elements. Their task is to transfer the tilting movement of the plate body into a steering movement of the wheels. Two spring damper elements are provided to position the angle of the plate body in the unloaded state in such a way that no steering movement occurs. The spring dampers are positioned on each of two sides between the cross member and the plate body. The structure makes it possible to partially dampen unevenness in the road surface.

The disclosure GB 2225990 A describes a running gear for a roller board, for example a skateboard, which is based on a similar principle as in disclosure DE 10 2006 057 167 A1. One difference to DE 10 2006 057 167 A1 is that in GB 2225990 A two cross members are used. Thus, the tilt of the rolling board causes not only a steering movement of the wheels, but also a change in the wheel spread.

SUMMARY

The disclosure describes a running gear (or chassis) for small electric vehicles. A running gear for small electric vehicles according to an aspect comprises two wheels, a frame connection for connecting the running gear to a vehicle main frame, a rocker beam assembly, a central bolt, a flexible transverse link plate, two uprights, ball joints, two steering rods and a steering device, wherein each one of the two wheels is mounted on a respective one of the two uprights, the two uprights are each connected to the flexible transverse link plate, to the rocker beam assembly and to a respective one of the two steering rods by means of the ball joints, the rocker beam assembly is connected to the frame connection by means of the central bolt, and the flexible transverse link plate is fixedly connected to the frame connection via at least two points.

By "fixed" is meant a connection that cannot be released by itself, comprising both a displaceable connection, for example by means of a bearing, or a non-displaceable connection, for example by clamping or screwing. The connection can be realized directly or indirectly, via another component or connecting elements. An exemplary function of the fixed connection is to prevent relative shifting of the components at the connection point and not to allow rotation. Another exemplary function of the fixed connection is to prevent relative shifting of the components at the connection point but to allow rotation.

The running gear can be understood as a hybrid running gear of skateboard running gear and car running gear. It enables the following functions, in combination or independently of each other: a tilting of the vehicle, a steering of the vehicle, a damping of road unevenness, and an avoidance of an uncontrolled tilting of the vehicle. Preferably, the aforementioned functions can be implemented in such a way that they operate independently of each other without one function inadvertently causing the other: for example, the steering radius need not be directly related to the vehicle's tilt angle. Furthermore, driving over uneven surfaces on one side does not necessarily have to result in an unintended steering movement.

An exemplary field of application of the running gear is three-wheeled electrified pedal scooters, enabling the driver to comfortably drive over paving stones and drive up curbs. In addition, the running gear enables simple assembly, which allows a reduction in additional costs compared to conventional scooters.

BRIEF DESCRIPTION OF THE DRAWINGS

Exemplary embodiments of a running gear for small electric vehicles, referred to as a hybrid running gear, are described below with respect to the following

EXEMPLARY EMBODIMENTS

Figure 1:
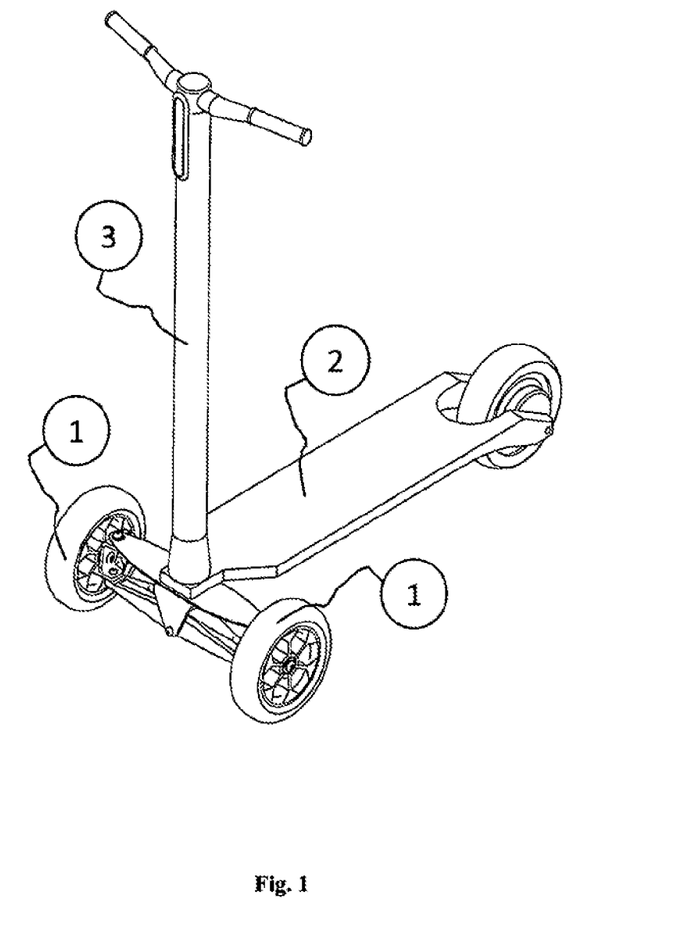
FIG. 1 shows a scooter with an exemplary embodiment of a running gear.
Figure 2:
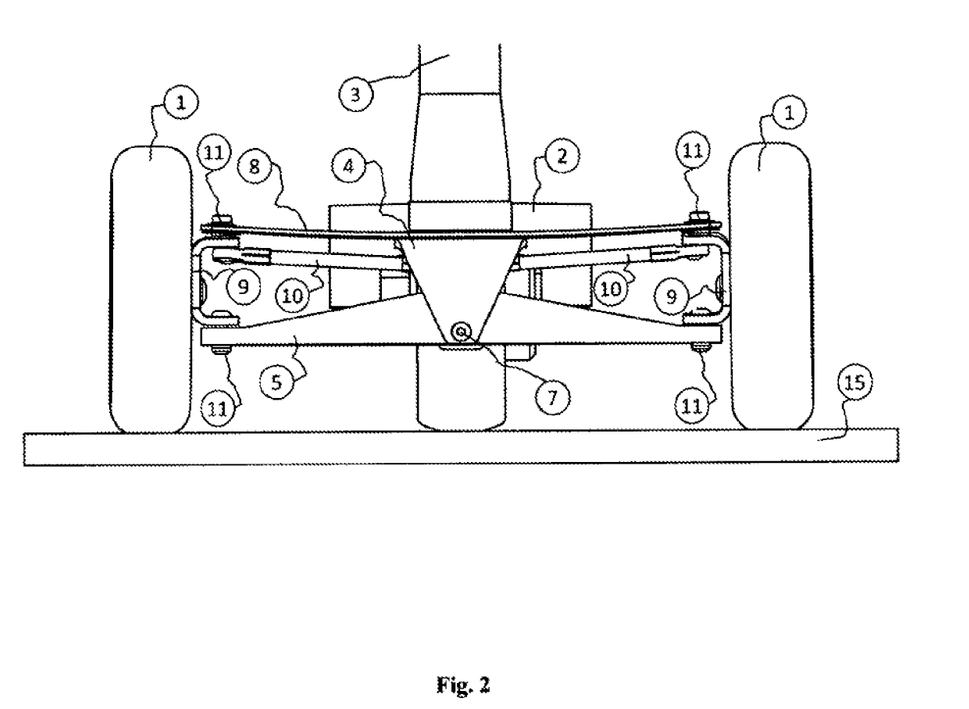
FIG. 2 shows a frontal view of the running gear.
Figure 3:
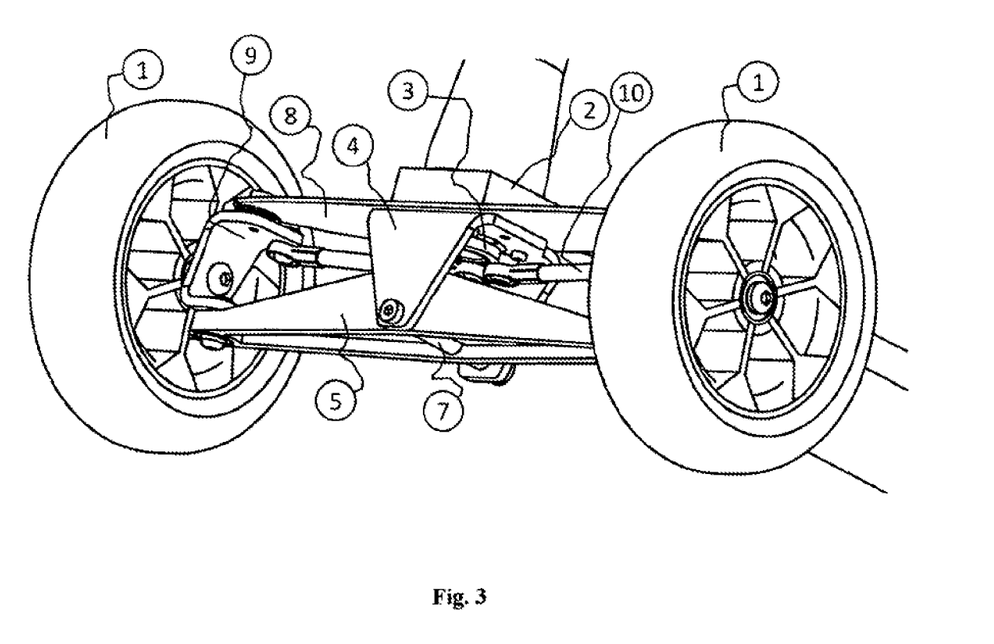
FIG. 3 shows a three-dimensional view of the running gear.

An exemplary embodiment of a hybrid running gear is presented below using the example of a three-wheeled scooter, which belongs to the vehicle category small electric vehicles. The three-wheeled scooter is shown in FIG. 1, wherein the hybrid running gear refers to the device connecting the two front wheels 1 to the scooter frame 2 and the steering device 3. Additionally, the exemplary scooter has a motorized rear wheel. In an additional embodiment, the scooter may have a seat option. FIG. 2 and FIG. 3 show an exemplary embodiment of the hybrid running gear from two different perspectives as well as its components, in this case comprising a frame connection 4, a rigid rocker beam assembly 5, a central bolt 7, a flexible transverse link plate 8 fixedly connected to the frame connection 4 at at least two points, two uprights 9 for supporting the two front wheels 1, and two steering rods 10 each connecting one of the uprights 9 to the steering device 3.

In the embodiments shown in FIG. 1 to FIG. 7, the flexible transverse link plate 8 is a one-piece continuous plate that connects both uprights 9 to the frame connection 4, wherein the fixed connection to the frame connection 4 is realized, for example, by means of screws, such that no rocking movement of the flexible transverse link plate 8 relative to the frame connection 4 is possible and thus tilting of the vehicle causes elastic bending of the flexible transverse link plate 8.

The properties of the flexible transverse link plate 8 are a high degree of flexibility in one spatial direction only and, at the same time, high breaking strength in all spatial directions. This can be achieved, for example, by means of a thin and wide-cut plate, made of fiber-reinforced plastic or spring steel.

The connection between the uprights 9 and each of the rocker beam assembly 5, the flexible transverse link plate 8 and the steering rods 10 is realized by conventional ball joints 11.

The frame connection 4 serves as the central connecting element and is fixedly connected to the scooter frame 2. In alternative embodiments, the frame connection 4 can be part of the vehicle main frame.

Figure 4:
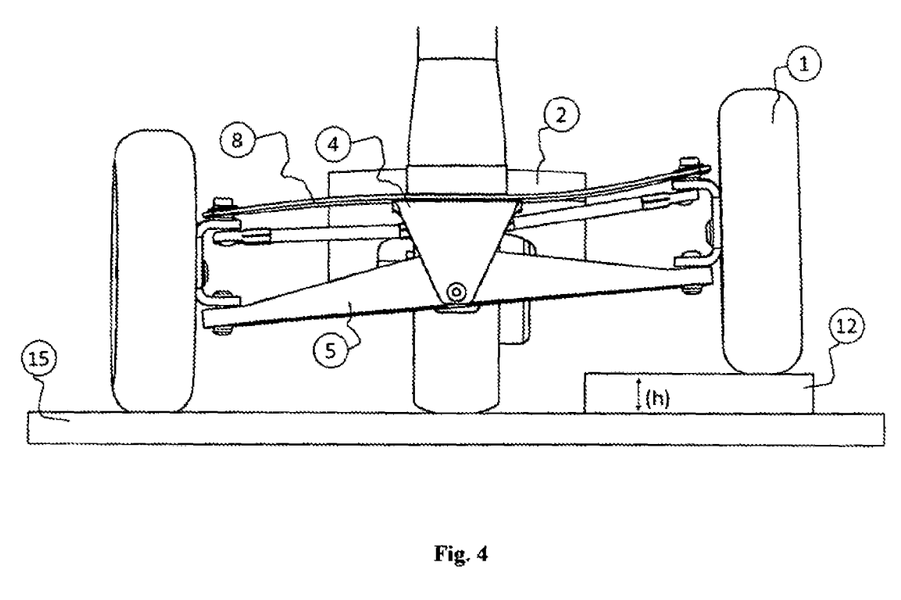
FIG. 4 shows the running gear passing over an exemplary obstacle.

The central bolt 7 is the only direct connection between the rocker beam assembly 5 and the frame connection 4 in such a way that a rocking movement of the rocker beam assembly 5 about the central bolt 7 is made possible. Among other things, this allows the scooter frame 2 to tilt sideways, thus favoring cornering at high speed. Another advantage of the rocking motion becomes apparent when driving over uneven surfaces, as described below. FIG. 4 shows a scenario in which one of the two front wheels 1 passes over a bump 12 of height h without the scooter frame 2 tilting to the side, the latter prevented by the driver. The rocking motion of the rocker beam assembly 5 creates a lifting effect that causes the frame connection 4 and finally the scooter frame 2 to be lifted only halfway h/2. Since the driver is on the scooter frame 2, he only perceives half of the height of the unevenness.

Similar to a conventional car running gear, the flexible transverse link plate 8 ensures virtually unchanged wheel spread. In a conventional car running gear, a flexible transverse link plate would be unthinkable due to the high lateral forces, which is why rigid transverse links are usually used, which have to be mounted on the vehicle frame by means of bearings. In a small electric vehicle, on the other hand, the driving speed is much lower, which also significantly reduces the lateral forces acting on the wheels. Finally, the latter allows the use of the flexible transverse link plate 8. In the application of a three-wheel vehicle, the flexible transverse link plate 8 has two major advantages over conventional rigid transverse links mounted on the vehicle frame.

First, the flexible transverse link plate 8 can be bolted to the frame connection 4, eliminating the need for a bearing and thus providing cost and wear advantages. Secondly, the bolted connection can cause the flexible transverse link plate 8 to bend, which counteracts the inclination of the vehicle. This ensures that in the unloaded case the scooter frame 2 is always parallel to the rocker beam assembly 5. This prevents uncontrolled tilting of the exemplary scooter. In conventional tilting running gears with mounted rigid transverse links, uncontrolled tilting of the vehicle is achieved by means of additional spring damper systems, the need for which, however, can be dispensed with in the hybrid running gear.

Figure 5:
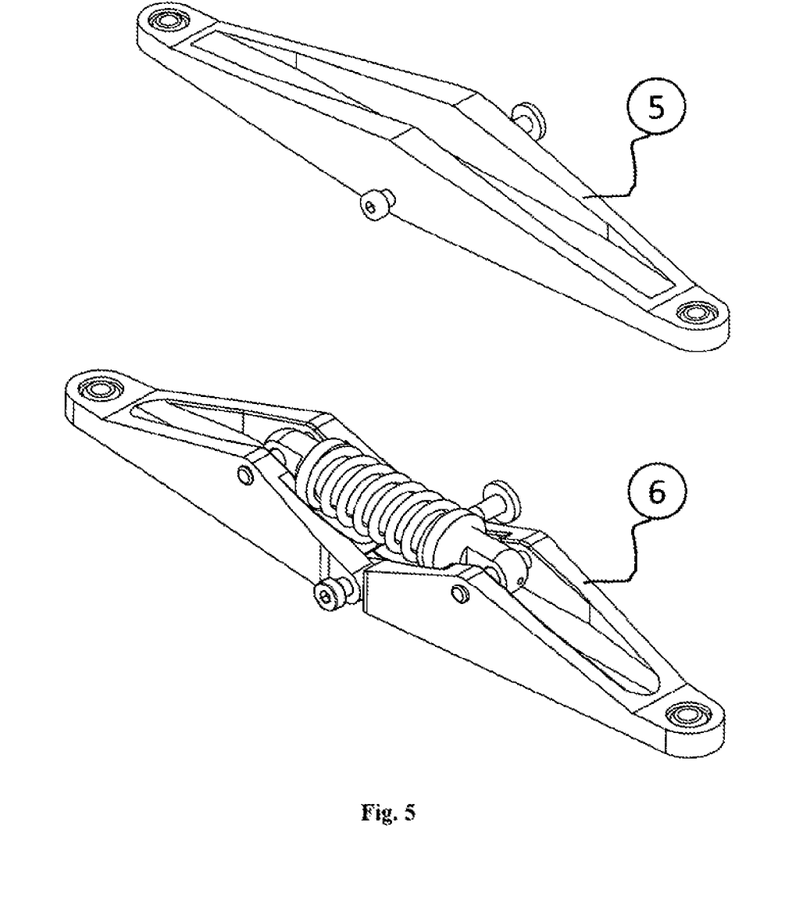
FIG. 5 shows two versions of the rocker beam assembly.
Figure 6:
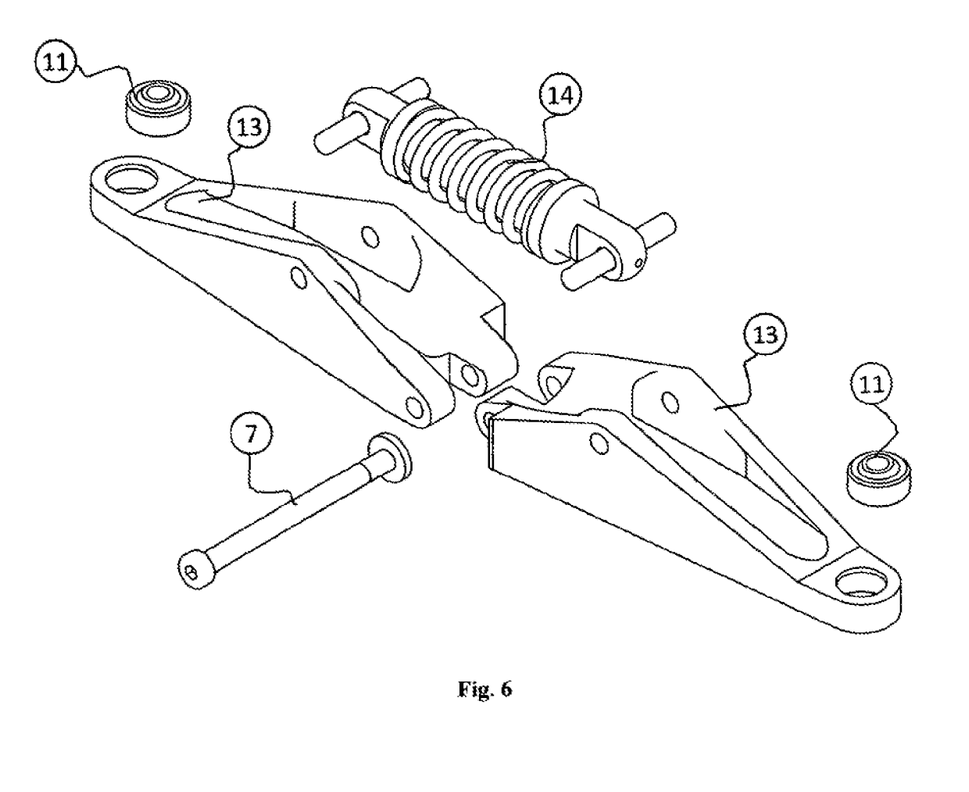
FIG. 6 shows an exploded view of the damped rocker beam assembly.

Furthermore, it can be seen from FIG. 4 that the unevenness height h is reduced by the rigid rocker beam assembly 5, but not damped and not fully compensated. Damping can be realized by replacing the rigid rocker beam assembly 5 with a damped rocker beam assembly 6. FIG. 5 shows how a damped rocker beam assembly 6 differs from a rigid rocker beam assembly 5. FIG. 6 shows an exploded view of the damped rocker beam assembly 6, consisting of two support arms 13 connected by the central bolt 7. Another component of the damped rocker beam assembly 6 is a conventional spring damper 14 positioned above the central bolt 7 and connected at each end to one of the support arms 13 in such a way that the two support arms 13 can be supported against each other.

FIG. 5 and FIG. 6 show that, compared to the rigid rocker beam assembly 5, the damped rocker beam assembly 6 has a degree of freedom that allows both support arms to pivot or rock relative to each other. The spring damper 14 is compressed in the process.

Figure 7:
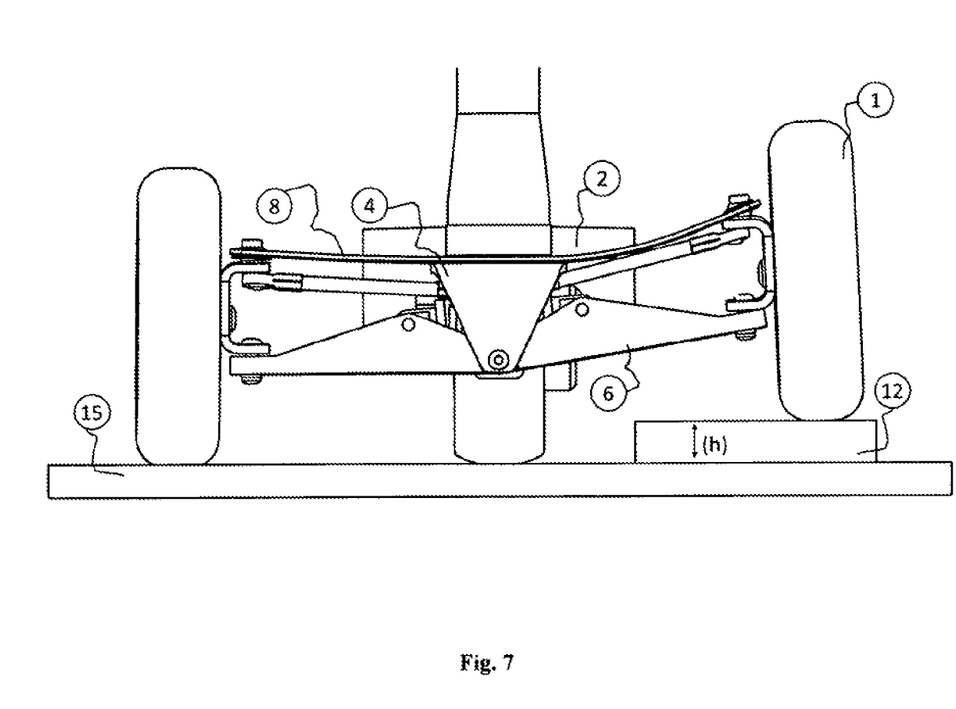
FIG. 7 shows the running gear with a damped rocker beam assembly driving over an obstacle.

FIG. 7 shows the same scenario as in FIG. 4, in which one of the front wheels 1 runs over a bump 12 with height h without tilting the scooter frame 2. In contrast to FIG. 4, a damped rocker beam assembly 6 is used in the exemplary embodiment in FIG. 7. Due to the additional degree of freedom in the damped rocker beam assembly 6, the bump 12 can be almost fully compensated, so that the frame connection 4 and finally the scooter frame 2 are hardly lifted. Thus, the unevenness is hardly noticed by the driver.

Figure 8:
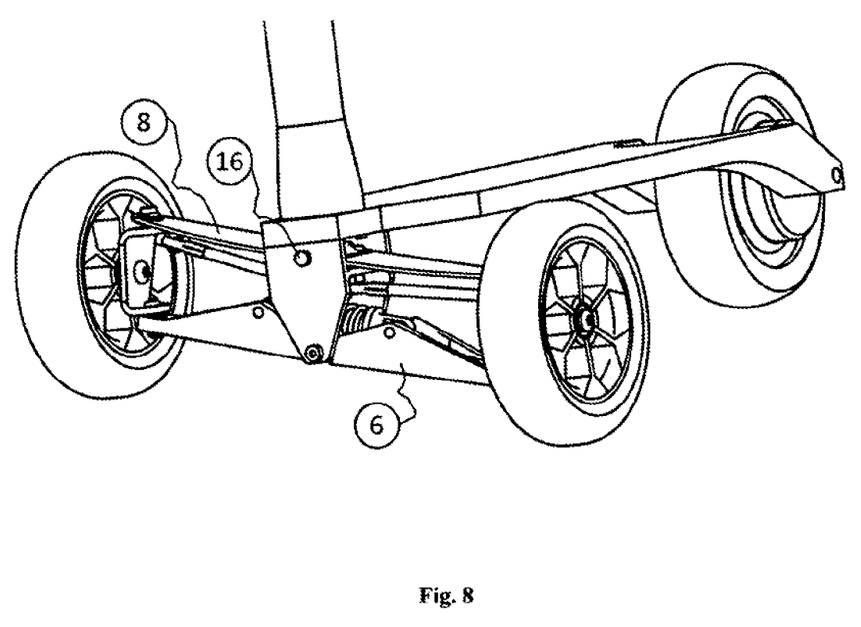
FIG. 8 shows another exemplary embodiment of the running gear.

FIG. 8 shows another exemplary embodiment of the running gear. The running gear shown makes it possible to increase the tilt angle of the vehicle without risking overloading of the flexible transverse link plate 8. This is achieved by not bolting the flexible transverse link plate 8 to the frame connection 4, but by mounting it on the frame connection 4 by means of an axle adapter 16 in such a way that the flexible transverse link plate 8 can execute a rocking movement relative to the vehicle frame.

Figure 9:
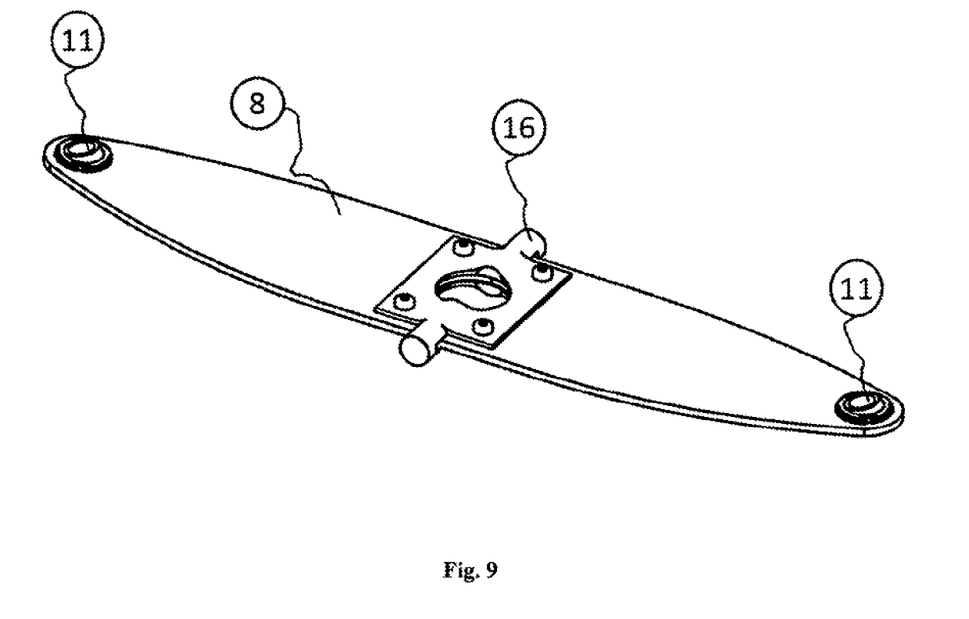
FIG. 9 shows a part of the running gear shown in FIG. 8.

FIG. 9 shows the flexible transverse link plate 8 and the aforementioned axle adapter 16, wherein both of the aforementioned components are connected to each other, for example bolted or pressed, and thus act as one component.

In addition, the axle adapter 16 can be supported on the vehicle frame by means of a spring and/or damper system not shown, in such a way that the rocking movement of the flexible transverse link plate 8 is damped.

LIST OF REFERENCE NUMERALS

1 Wheels
2 Scooter frame
3 Steering device
4 Frame connection
5 Rigid rocker beam assembly
6 Damped rocking beam assembly 7 Central bolt
8 Transverse link plate
9 Uprights
10 Steering rods
11 Ball joints
12 Bump
13 Support arms
14 Spring damper
15 Roadway
16 Axle adapter

The invention claimed is:

1. A running gear for small electric vehicles, comprising
two wheels;
a frame connection for connecting the running gear to a vehicle main frame;
a rocker beam assembly;
a central bolt;
a flexible transverse link plate;
two uprights;
a plurality of ball joints;
two steering rods; and
a steering device;
wherein each one of the wheels is mounted on one of the uprights, the two uprights being connected by one of the ball joints to the flexible transverse link plate, and to the rocker beam assembly and to one of the respective steering rods; and
wherein the rocker beam assembly is connected to the frame connection by the central bolt, the flexible transverse link plate being fixedly connected to the frame connection in at least two points.

2. The running gear according to claim 1, wherein the rocker beam assembly is a single workpiece, which has a first bore at its center for receiving the central bolt, and second bores at its respective ends, each second bore receiving one of the ball joints.

3. The running gear of claim 1, wherein the rocker beam assembly comprises a spring damper and two rigid support arms, each support arm having
a second bore at one end to receive one of the ball joints,
a first bore at the other end to receive the central bolt, and
a third bore between the first bore and the second bore to receive the spring damper;
wherein both support arms are mounted on the central bolt and support each other via the spring damper.

4. The running gear according to claim 1, wherein the flexible transverse link plate is non-displaceably connected to the frame connection, so that the flexible transverse link plate is subjected to an elastic bending load when the vehicle tilts, which bending load counteracts the tilting of the vehicle.

5. The running gear according to claim 1, wherein the flexible transverse link plate is displaceably connected to the frame connection, so that the flexible transverse link plate is supported in the frame connection and thus a rocking movement of the flexible transverse link plate relative to the frame connection is made possible.

6. The running gear according to claim 1, wherein the flexible transverse link plate is a one-piece continuous plate connecting both uprights to the frame connection.

7. A running gear for small electric vehicles, comprising
two wheels;
a frame connection for connecting the running gear to a vehicle main frame;
a rocker beam assembly;
a central bolt;
a flexible transverse link plate;
two uprights;
a plurality of ball joints;
two steering rods; and
a steering device;
wherein each one of the wheels is mounted on one of the uprights, the two uprights each being connected by one of the ball joints to the flexible transverse link plate, to the rocker beam assembly and to one of the respective steering rods;
wherein the rocker beam assembly is connected to the frame connection by the central bolt, the flexible transverse link plate being fixedly connected to the frame connection in at least two points; and
wherein the flexible transverse link plate is non-displaceably connected to the frame connection, so that the flexible transverse link plate is subjected to an elastic bending load when the vehicle tilts, which bending load counteracts the tilting of the vehicle.

8. The running gear according to claim 7, wherein the rocker beam assembly is a single workpiece, which has a first bore at its center for receiving the central bolt, and second bores at its respective ends, each second bore receiving one of the ball joints.

9. The running gear of claim 7, wherein the rocker beam assembly comprises a spring damper and two rigid support arms, each support arm having
a second bore at one end to receive one of the ball joints,
a first bore at the other end to receive the central bolt, and
a third bore between the first bore and the second bore to receive the spring damper;
wherein both support arms are mounted on the central bolt and support each other via the spring damper.

10. The running gear according to claim 7, wherein the flexible transverse link plate is a one-piece continuous plate connecting both uprights to the frame connection.

11. A running gear for small electric vehicles, comprising
two wheels;
a frame connection for connecting the running gear to a vehicle main frame;
a rocker beam assembly;
a central bolt;
a flexible transverse link plate;
two uprights;
a plurality of ball joints;
two steering rods; and
a steering device;
wherein each one of the wheels is mounted on one of the uprights, the two uprights each being connected by means of one of the ball joints to the flexible transverse link plate, to the rocker beam assembly and to one of the respective steering rods;
wherein the rocker beam assembly is connected to the frame connection by means of the central bolt, the flexible transverse link plate being fixedly connected to the frame connection in at least two points; and
wherein the flexible transverse link plate is displaceably connected to the frame connection, so that the flexible transverse link plate is supported in the frame connection and thus a rocking movement of the flexible transverse link plate relative to the frame connection is made possible.

12. The running gear according to claim 11, wherein the rocker beam assembly is a single workpiece, which has a first bore at its center for receiving the central bolt, and second bores at its respective ends, each second bore receiving one of the ball joints.

13. The running gear of claim 11, wherein the rocker beam assembly comprises a spring damper and two rigid support arms, each support arm having
- a second bore at one end to receive one of the ball joints;
- a first bore at the other end to receive the central bolt; and
- a third bore between the first bore and the second bore to receive the spring damper;
- wherein both support arms are mounted on the central bolt and support each other via the spring damper.

14. The running gear according to claim 11, wherein the flexible transverse link plate is a one-piece continuous plate connecting both uprights to the frame connection.

\* \* \* \* \*